ated Aug. 10, 1954

2,686,127

UNITED STATES PATENT OFFICE 2,686,127

MANUFACTURE OF ALGINIC MATERIALS

Richard Henry McDowell, Dipple by Girvan, Scotland, assignor to Alginate Industries Limited, London, England, a British company No Drawing. Application October 15, 1951, Serial No. 251,461

Claims priority, application Great Britain October 18, 1950

8 Claims. (Cl. 99—131)

This invention comprises improvements in the manufacture of alginic materials.

A valuable property of alginic materials is their ability in certain conditions to form aqueous gels. Such gels consist essentially of a highly swollen water insoluble alginate dispersed substantially uniformly throughout an aqueous medium in which other substances may or may not be present. There is however a known difficulty in producing satisfactory gels by addition of alginic materials to aqueous solutions, and it is an object of the present invention to provide an improved means of dealing with this problem.

According to the present invention a process of preparing an alginate jelly comprises first mixing in the presence of adequate moisture calcium alginate and a water soluble ortho-phosphate of a base of which the alginate is soluble in water and such that in the resulting reaction substantially all the calcium is combined as tricalcium phosphate, and after such reaction introducing the product into an aqueous medium and gelling by means of a free acid. The free acid can be provided for example by chemical reaction within the aqueous medium, or by any other means such as by diffusion of free acid into the aqueous medium which is to be gelled. When the free acid is to be provided by chemical reaction the substance which provides it may be introduced at the same time as the alginic material.

In acid conditions the equilibrium between alginate phosphate, calcium and alkali metal ions is such as to favor the formation of insoluble calcium alginate. In the conditions described the calcium alginate gives a uniform gel structure throughout the medium.

One advantage of the present invention is that the tricalcium phosphate, being colloidally dispersed, enables the jellies formed to be much more transparent than when previously described methods, employing insoluble calcium salts in particulate form, are used. A further advantage is that owing to the uniform dispersion of the gel-forming constituents throughout the medium a more rigid jelly can be prepared with a given concentration of alginate than is the case when one of the reactants is in particulate form.

It is advisable that there should be included at the time when the aqueous solution is to be gelled a substance which delays gelling. This may, for example, be an alkali phosphate, and if, in the first step of the process, an excess of alkali phosphate is employed over and above that which is necessary to react with the calcium alginate present, the result will be an excess of alkali phosphate in the product which will delay the setting of the gel and give ample time for ensuring its thorough mixing with the aqueous medium. Alternatively, the substance which delays gelling may consist of an excess of an alkali alginate, which may be provided by using no excess of alkali phosphate in the first step and adding alkali alginate after the reaction with the phosphate is completed.

The following examples are given by way of illustration of possible methods of carrying the invention into effect:

Example I

Sodium alginate containing colloidal calcium phosphate is prepared by intimately mixing in the wet state, calcium alginate with 1.2 times the theoretical amount of trisodium phosphate necessary to react with all the calcium present. This mixture is dried to a moisture content of 15% and milled and sifted into different mesh sizes.

The following are then mixed together:

2.5 grams of the just described sodium alginate calcium phosphate preparation (through 44 mesh, on 100 mesh);
1.0 gram gluconic delta lactone.

The solid powders are mixed dry and dissolved in 400 mls. cold water, stirring for about 5 minutes. The mixture remains pourable for about ½ hour and is set to a definite jelly within 2 hours. The strength of this jelly increases for at least 12 hours The mesh size chosen in this example is suitable for dissolving where large quantities of other materials are not being mixed into the water at the same time.

In this example the acid is provided by the hydrolysis of the gluconic delta lactone to gluconic acid.

Example II

The following are taken:

1.25 grams of the aforesaid sodium alginate calcium phosphate preparation (through 100 mesh);
0.65 gram sodium alginate (through 100 mesh);
1.5 grams gluconic delta lactone;
60 grams sugar (castor);
340 mls. water.

The powders are mixed dry and then added to the water with stirring. Solution will be complete in about 5 minutes. Setting commences in about ¼-hour and a jelly strong enough to be turned out of a mold is formed within 2 hours. Strength increases for at least 12 hours.

In this example, where the amount of sugar is large compared with the alginate, the minus 100 mesh size is preferable for rapid solution.

*Example III*

The following are taken:

10 grams of the said sodium alginate calcium phosphate preparation (through 44 mesh, on 100 mesh);
4 grams mono ammonium phosphate;
10 mls. formaldehyde (40%);
380 mls. water.

The alginate preparation is dissolved in about 300 mls. of water and the ammonium phosphate in the remainder of the water is added as soon as the alginate has dissolved. The formaldehyde is then stirred in. This mixture commences to set in about 1½ hours and gives a very rigid jelly within 24 hours.

In this example the acid is provided by the reaction of formaldehyde with the ammonium phosphate to form hexamine and phosphoric acid.

In all the above examples described acid is liberated by chemical reaction throughout the mixture and the rate of this reaction is dependent on temperature, being more rapid as the temperature is raised. The reactants should always be mixed cold to ensure thorough mixing before reaction is appreciable but the process of setting can be accelerated by warming the mixture to, for example, 60° C. (140° F.) by suitable means, after this.

*Example IV*

In this example acid is supplied to the medium to be gelled by a process of diffusion.

The following are taken:

10 grams of the said sodium alginate calcium phosphate preparation (100 mesh);
250 grams sucrose;
125 grams glucose (80% syrup);
115 ml. water;
Color and flavor as required.

The alginate preparation and 50 grams of the sugar is stirred into the water until dissolved, and the remaining sugar and glucose is then mixed in. The mixture is heated to boiling point to expel air bubbles, and small portions are introduced into a solution consisting of:

100 grams citric acid;
400 grams sucrose;
250 grams glucose (80% syrup);
250 ml. water.

Gelling takes place from the outside of the portion, and the extent to which gelling takes place is controlled by the length of time of the immersion in the acid solution. Suitably colored and flavored, such jellies form edible products suitable for use in confectionary and baking.

*Example V*

This example was carried out with a view to demonstrating the employment of sodium alginate as a gel-retarding substance and to this end some material prepared without any excess of sodium alginate was tried in parallel with material having an excess of sodium alginate, but no other means of retarding the formation of a gel.

2500 gms. moist calcium alginate was mixed with 164 gms. trisodium phosphate in a small laboratory mixer. After 1 hour a small sample (20 gms. D. M.) was taken out and dried and to the remainder was added 333 gms. of dry sodium alginate. This was mixed for a further 1 hour and then dried.

2% solutions (net weight) of the dried samples (with and without the sodium alginate) were prepared.

Jelly mixtures were made up as follows:

250 gms. 2% solution as above, diluted to 350 gms. with water, 2 gms. gluconic lactone dissolved in water to 50 gms., quickly mixed in.

A. *Mix without added sodium alginate.*—Jelly set in 1 minute. Syneresis noticeable after 1 hour. After 24 hours 290 ml. of jelly had separated into solid 258 ml. and liquid 32 ml.

B. *Mix with added sodium alginate.*—Jelly set in about 4 minutes. No syneresis visible after 1 hour, only 2 ml. after 24 hours.

This is a useful jelly, but is not as clear as that made from a mix containing 20%, excess trisodium phosphate.

I claim:

1. A process of preparing an alginate jelly which comprises first mixing in the presence of adequate moisture calcium alginate and a water soluble ortho-phosphate of a base of which the alginate is soluble in water and such that in the resulting reaction substantially all the calcium is combined as tricalcium phosphate, and after such reaction introducing the product into an aqueous medium which is to be gelled and gelling by means of a free acid.

2. A process as claimed in claim 1 wherein the free acid is provided by chemical reaction within the aqueous medium.

3. A process as claimed in claim 2 wherein the substance which reacts to produce the acid is introduced into the aqueous medium at the same time as the alginic material.

4. A process as claimed in claim 1 wherein the free acid is provided by diffusion of free acid into the aqueous medium which is to be gelled.

5. A process as claimed in claim 1 wherein a substance which delays gelling is included in the aqueous solution at the time when it is to be gelled.

6. A process as claimed in claim 5 wherein an alkali phosphate is the substance which delays gelling.

7. A process as claimed in claim 6 wherein excess alkali phosphate is employed in the mixture in the first stage of the process and remains as such therein to the second stage of the process to act as the substance which delays gelling.

8. A process as claimed in claim 5 wherein an excess of alkali alginate is the substance which delays gelling.

References Cited in the file of this patent

UNITED STATES PATENTS

| Number | Name | Date |
|---|---|---|
| 2,441,729 | Steiner | May 18, 1948 |
| 2,536,708 | Angermeier | Jan. 2, 1951 |

FOREIGN PATENTS

| Number | Country | Date |
|---|---|---|
| 573,589 | Great Britain | Nov. 28, 1945 |